(No Model.)  5 Sheets—Sheet 1.

R. DUTTON.
MACHINE FOR GRINDING MOWING MACHINE KNIVES.

No. 342,290. Patented May 18, 1886.

Attest:
Philip F. Larner.
Nowell F. Battle.

Inventor:
Rufus Dutton,
By Wm C. Wood
Attorney.

(No Model.) 5 Sheets—Sheet 2.
R. DUTTON.
MACHINE FOR GRINDING MOWING MACHINE KNIVES.
No. 342,290. Patented May 18, 1886.

Attest:
Philip F. Larner.
Lowell Battle.

Inventor:
Rufus Dutton,
By Wm. C. Wood
Attorney.

(No Model.) 5 Sheets—Sheet 3.

R. DUTTON.
MACHINE FOR GRINDING MOWING MACHINE KNIVES.

No. 342,290. Patented May 18, 1886.

Attest:
Philip F. Larner.
Nowell Castle.

Inventor:
Rufus Dutton.
By McCord
Attorney.

(No Model.) 5 Sheets—Sheet 4.

R. DUTTON.
MACHINE FOR GRINDING MOWING MACHINE KNIVES.

No. 342,290. Patented May 18, 1886.

Attest:
Philip F. Larner.
Lowell T. Bartle.

Inventor:
Rufus Dutton,
By Wm. C. Wood
Attorney.

(No Model.) 5 Sheets—Sheet 5.

R. DUTTON.
MACHINE FOR GRINDING MOWING MACHINE KNIVES.

No. 342,290. Patented May 18, 1886.

Attest:
Philip F. Larner.
Howell Bartle

Inventor:
Rufus Dutton.
By Wm C Mors
Attorney.

UNITED STATES PATENT OFFICE.

RUFUS DUTTON, OF YONKERS, ASSIGNOR TO THE MOWER KNIFE GRINDER COMPANY, OF NEW YORK, N. Y.

MACHINE FOR GRINDING MOWING-MACHINE KNIVES.

SPECIFICATION forming part of Letters Patent No. 342,290, dated May 18, 1886.

Application filed June 1, 1885. Serial No. 167,282. (No model.)

*To all whom it may concern:*

Be it known that I, RUFUS DUTTON, of Yonkers, in the county of Westchester and State of New York, have invented certain new and useful Improvements in Machines for Grinding Mower-Knives; and I do hereby declare that the following specification, taken in connection with the drawings furnished and forming a part of the same, is a clear, true, and complete description of my invention.

Very many machines in this line have been heretofore devised and patented, and for the better understanding of the character of my invention I will first state that said prior machines may be fairly divided into four general classes—namely, first, those which embody longitudinally-reciprocating hones of various kinds and form; second, those which embody wheels having angular or beveled grinding-surfaces at their peripheries, and are either adapted to operate simultaneously upon the coincident edges of the two adjoining knife-sections, as when the wheels are wide and have a double bevel, or upon one edge at a time, as when said double-beveled wheels have grinding-faces which are narrow, or when they are wide and are beveled from one edge only; third, those which embody grinding-wheels having peripheries which are not used for this service, but have either flat or beveled sides, which afford the grinding-surface for contact with a mower-knife; and, fourth, such as embody grinding-wheels having flat or rectangular faced peripheries, which afford the requisite grinding-surface. These four classes of machines include only such as have been specially organized for grinding mower-knives, and do not include another large variety of patented devices, which are, in fact, special attachments, for use with ordinary grindstones and upon their regular frames; but as such grindstones have usually flat-faced peripheries they with said attachments approximate more or less closely to the last-named variety of mower-knife-grinding machines, and it is to this particular class that my machines belong when embodying my complete invention.

Nearly all of the prior machines thus generally referred to have means of some kind for holding a mower-knife during the grinding operation, and said grindstone attachments are solely for the purpose of facilitating the holding and handling of the knife by the grinder.

It is well known that the grinding of mower-knives upon the peripheries of ordinary grindstones as a rule soon unfits the latter for other service, also that the variable movement of such grindstones, as well as their liability to have nicked edges or soft spots, render special machines for this service very desirable. It is also well known that a grinding-wheel having a beveled periphery of special angular dimensions for working simultaneously on two adjacent knife-edges soon loses its special form and operates irregularly, because the angular center is soon worn away to a rounded rib, and the same is partly true of such grinding-wheels as have a beveled periphery adapted to operate only on one edge of a knife-section at a time, and necessitating the successive working of all the parallel knife-edges and then reversing the position of the knife both lengthwise and widthwise for successively working the alternate remaining edges. The importance of uniformity in grinding mower-knives is not only apparent with reference to satisfactory field-service, but also in the matter of economy in the knives themselves, and I have proceeded in the development of my machines upon the theory that a grinding-wheel with a constantly-varying face contour cannot be relied upon to operate with uniformity upon a mower-knife, and one object of my invention is to provide for a substantially uniform rectangular grinding-face regardless of the inevitable gradual reduction of the diameter of the grinding-wheel. To this end I have, as I believe, for the first time specially proportioned the width of the periphery of a flat rectangular-faced grinding-wheel to the width of a mower-knife section, so that in grinding one edge of a knife-section the point of its contact with the grinding-surface will traverse from one edge of the face of the stone nearly to the opposite edge thereof, and then in grinding the next adjacent edge of the next knife-section (and from the bottom of the V to the tip in both cases) the grinding-surface will be oppositely traversed, thus not only subjecting the entire face to uniform abrasion, but also maintaining sufficiently full grinding-edges on the wheel for working well into the V-junction of any two knife-sections. In other words, for obtaining the best results I employ a grinding-wheel having a flat rectangular face at its periphery a little wider than one-half the width of a knife-section, and therefore I am enabled to always grind each portion of a knife-edge upon a corresponding portion of the grinding-surface, and to alternately subject the grinding-wheel to abrasive action, first from one edge inward and then from the opposite edge inward, and each time to subject the intervening portions of the periphery to uniform service, even when one knife-edge chances to be nicked more than another, because such nicks are as liable to occur in one knife-edge as another, and therefore the extra abrasive effect on the face of the grinding-wheel in working out such nicks will be substantially equalized.

Flat rectangular-faced wheels or stones in mower-knife grinding machines as heretofore organized have been combined with knife-holding devices, so that the grinding-surface of the wheels either operated at right angles to the edge of each knife-section and crosswise of its beveled edge or substantially parallel with said edge and its bevel. I desire that my wheel shall have its grinding-surface operate angularly to the knife-edge, so that the abrasive lines on the latter will be diagonal to the edge. This desirable arrangement of the abrasive lines is, however, a result of the use of some machines having beveled or angular faced grinding-wheels, and also the result of skillful grinding by hand on a specially selected grindstone, and also the result of skillful manipulation of the knife while partially held by some one of the hereinbefore-mentioned grindstone attachments; but I believe I am the first to devise a machine embodying a grinding-wheel having a flat rectangular periphery for its grinding-surface and means for holding the knife so accurately that the knife need not be touched by the hand of the operator during the grinding-contact of the knife and wheel, and which will develop abrasive lines angularly to each knife-edge, and which will always progressively grind each portion of each edge upon a corresponding portion of the grinding-surface, and thus secure uniform wear of the wheel and enable a person of ordinary intelligence to grind a mower-knife as evenly and more economically than if ground by the most skillful grinder with a perfect grindstone, whether used with or without any of the before-mentioned attachments, by which the grinding operation may be more conveniently performed than when the knife is held solely in the hands of the operator. In such prior machines as embody what are known as "flat-faced grinding-wheels" (in that they have grinding-faces rectangular to the sides of the wheel or stone) the wheels have been so mounted that they could be operated in various inclined positions for grinding the bevels of knife sections, and so as to be moved along each edge from its base or junction to its tip, and in all specially organized machines of this particular class the pressure between the knife and wheel is applied directly by the operator in forcing the wheel toward the knife held in a non-yielding clamp. Grindstone attachments have heretofore embodied yielding or spring-backed clamps, which in all instances have been so constructed as to not only require the manipulation obviously necessary for adjusting a mower-knife lengthwise in the clamp, but also actual manipulation of said knife and clamp during the grinding operation; and although I employ a spring-backed clamp in machines embodying my complete invention, said clamp not only rigidly holds a knife, but presents it with proper pressure at either edge of the grinding-wheel face and in such exactly proper position as to require no touching of the knife or the clamp by the hands of the operator during the grinding-contact of the knife and wheel; and, unlike any other contrivance known to me for grinding mower-knives, said clamp is enabled to consecutively present the two coincident edges of any two successive knife-sections to the opposite edges of the flat grinding-face without readjustment of the knife in said clamp.

In many of said prior machines and attachments the clamps have been mounted upon frames and coupled to the grinding-wheel frame so as to provide for certain swiveling movements of one of said frames with relation to the other, and in every case the swinging movement of the clamp-frame and of the clamp thereon has been around certain axial points or centers which are wholly outside of and more or less remote from the grinding-wheel. Otherwise stated, said prior machines and attachments have embodied pivotal centers for their clamps and clamp-frames, which in each case have been located somewhere at the rear of the clamp, and in no case has the clamp-frame and wheel-frame been coupled by pivots or swiveled with reference to centers located in front of the clamp and coincident with the grinding-face.

Machines embodying the main features of my invention have a knife-clamp hinged on top of a clamp-frame and substantially rectangular thereto, and this clamp-frame is mounted on the grinding-wheel frame in front of the face of the clamp, and one or the other of said frames is swiveled with reference to the other, or both are swiveled, so that said clamp or said wheel can swing or be moved in the arc of a circle centering somewhere within the body of the grinding-wheel, and this peculiar construction is a characteristic feature of my machine. While I prefer, and in most cases employ, an actual guiding bolt or pivot for thus swiveling or coupling the clamp-frame and knife-frame together, that form of guide need not necessarily be relied upon for confining the movement of either frame as described, because a segmental guide, as the equivalent of the actual pivot, will also serve as a swiveling-pivot, as will hereinafter be made fully apparent.

When the bolt-pivot is employed, it obviously cannot be placed within the body of the stone or wheel; but the center of motion can be thus located by hinging said two frames, so as to limit them to the same plane while either is swinging, by means of a hinge-pivot outside of the grinding-wheel, opposite the center of its face and rectangular to its axis, and for the best results a small wheel is used and the knife-seats are located on the clamp, so as to present a knife against the face of the wheel at or about ninety degrees from the line of said bolt or pivot, so that said clamp in swinging around the face of the wheel from one angular position to the reverse angle will surely move in the arc of a circle centering within the body of the wheel. Whether the pivot or the segmental guide be used as the swiveling coupling, the knife-clamp can be relied upon for the first time in a mower-knife-grinding contrivance of the class embodying wheels or stones having flat or rectangular peripheral grinding-faces for consecutively presenting the coincident edges of any two knife-sections in precisely the same manner and with precisely the same relations to the grinding-surface at the two edges of the face of the grinding-wheel.

It has heretofore been proposed to grind the knife-sections while the knife is in position on the finger-bar of a mowing-machine, and machines for this purpose have been heretofore devised and patented. These machines have been provided with a clamp, by which they can be mounted upon the finger-bar, with and without the latter being clamped with the grinding-machine firmly upon the ground, the cutter-bar being on the finger-bar, and both being coupled to a mowing-machine and lying on the ground, as when in position for mowing.

My machines cannot be used upon a knife unless it is detached from the mowing-machine; but I have specially provided for convenient service in the field by mounting my machine upon a base-clamp so that it can be clamped to the traction-wheel of a mowing-machine when at rest, or to any other portion of the machine presenting similar surfaces.

I have also for the first time provided the grinding-wheel of a mower-knife grinder with an internal chamber for the reception of water, so that the machine with its wheel properly charged with water can be used in the field at any time without pouring water on the face of the stone, because the latter being revolved at proper speed has its face supplied with water from the interior as a result of centrifugal force. I am aware that it has been heretofore proposed to provide emery-wheels for ordinary grinding purposes with internal water-chambers, so that their grinding-surfaces may be supplied by water; but so far as I know I am the first to construct a chambered grinding-wheel and its mountings with special reference to use in a mower-knife grinder. In connection with chambered emery-wheels, a hollow driving-shaft has been heretofore employed, into which water is delivered by way of a stationary tube coincident with the axis of the shaft, thus necessitating a packing-gland for securing a water-tight connection at or near the junction of said tube with the interior of the driving-shaft, and said shaft is radially bored to admit of the outward passage of water into the annular chamber within the stone, and the latter is directly mounted upon said shaft, and clamped thereon by means of clamping-flanges. I deem this use of a stationary feeding-tube wholly impracticable in a mower-knife-grinding machine adapted to service in the field.

My chambered wheels with their mountings involve a variety of novel features in construction, all of which will be duly specified in the several clauses of claim hereunto annexed.

Referring to the drawings, Figure 1 in side view illustrates a complex form of machine embodying my complete invention, with the several parts of the machine so constructed and organized as to afford a great variety of adjustments and enable corresponding variations in the mode of working it.

Figure 2:
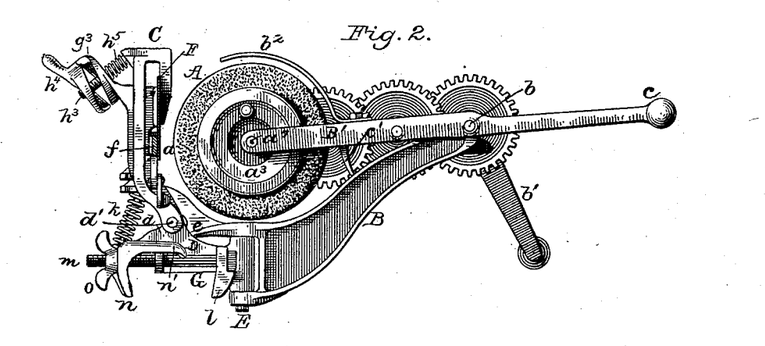
Figs. 2, 3, and 4 illustrate, in opposite side and plan views, a simpler form of machine with my complete invention embodied therein, but with the parts constructed and organized with reference to simplicity, economy, and convenient operation.
Figure 3:
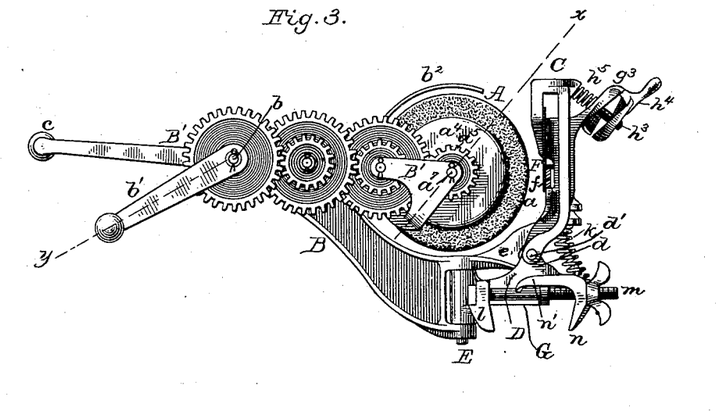
Figure 4:
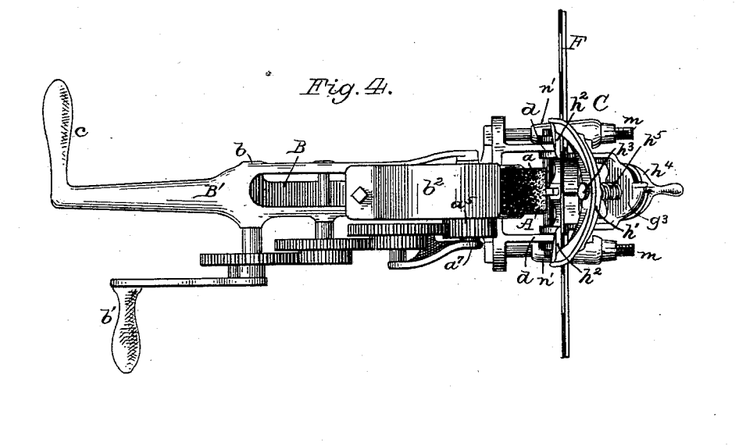

For explaining that portion of my improvement which relates to the peculiar relations of the knife-clamp and grinding-wheel, I will generally refer to and describe the parts of the machine necessarily involved, and at this time describe specifically only such features in construction as essentially relate to this branch of my invention, and in doing this I deem it best to refer to one of the simple forms of my machine—as, for instance, that shown in Figs. 2, 3, and 4.

The rectangular-faced grinding-wheel A is mounted in its frame B and provided with means for rotating it. The knife-clamp C is rectangularly mounted upon its frame D, and is essentially capable of vibration toward and from the face of the grinding-wheel and of rigidly holding and wholly supporting a mower-knife therein.

Either the knife-clamp frame or the grinding-wheel frame may serve as a bed-plate for the machine, in which case it is or may be provided with a base clamp; but these particular features are immaterial in this connection.

It is essential that the grinding-wheel frame B and the knife-clamp frame D be hinged together in some way in order to admit of varying the angular relations of the knife-clamp and grinding-wheel, and this feature, broadly considered, is present in very many prior machines; but in all of said prior machines the axial pivotal connections for uniting said frames have been located on the knife-clamp side of the machine more or less remote from the wheel, and, as hereinbefore stated, an important novel feature in construction by me consists in hinging said two frames together by or upon a pivot, E, which is located within the vertical plane occupied by the central portion of the grinding-wheel and below it, and in its best form said pivot is substantially radial to the center of the axis of said wheel. As a result of this novel feature in the construction of a mower-knife grinder, the relations of the rectangular face of the grinding-wheel and the knife are uniformly maintained, regardless of their angular variations in adjustment, because the wheel or the knife-clamp frame, as the case may be, vibrates around the center of the wheel and in the plane of its axis in swinging from one extreme angular position to the other. The grinding-wheel frame and the knife-clamp frame, thus hinged together in the plane of the center of the grinding-wheel, in order to be highly effective must be employed with a knife-clamp, which is mounted substantially at right angles to its frame and substantially parallel with the pivot which couples said frames, so that said clamp can swing on a hinge-joint at its foot toward and from the face of the wheel for presenting the knife while rigidly held in said clamp to the grinding-surface at a point thereon, which is about ninety degrees from the radial line occupied by the pivot on which the two frames are hinged together, as clearly shown in the drawings.

In addition to the rotation of the grinding-wheel and the capacity of the knife-clamp to move outward and from said wheel, either the knife-clamp or the wheel must also be capable of a reciprocating movement in a plane substantially parallel with the frame-pivot E. So far as relates to this portion of my invention it is immaterial whether the grinding-wheel be thus reciprocated while revolving, or the knife-clamp be correspondingly reciprocated while the wheel is revolved without reciprocation, as will hereinafter be more fully described.

The grinding-wheel A has a rectangular flat face or periphery, $a$, which constitutes the grinding-surface. The width of this face for obtaining the best results should be but little wider than one-half the width of the widest knife-section—as, for instance, I find that a wheel one inch and three-quarters wide at its face will operate to the best advantage regardless of the well-known slight variations in the width of mower-knife sections.

The diameter of the grinding-wheel may be widely varied, but its dimensions in this respect should of course correspond with the dimensions of the framing of the machine; but when convenient portability and economy are in view I avoid heavy framing, and consequently use a grinding-wheel about six inches in diameter, the machine being adapted to work with substantial uniformity until the wheel by abrasion has been reduced to, say, five inches in diameter, at which time a new wheel should be applied. The material of the wheel may be indefinitely varied without departure from certain portions of my invention, but certain other portions thereof depend upon a porous abrasive materal, such as the well-known free-grit natural sandstone or certain well-known varieties of artificial grinding-wheels which are free absorbents of water.

I have for the first time mounted a chambered wheel upon flanges, which not only clamp the wheel, as heretofore, but also accurately center the wheel; and, still further, said flanges serve as the side walls of the water-chamber, and one of said flanges is provided with a feed-hole and a plug, thus obviating the stationary feed-tube and packing heretofore used with chambered emery-wheels. This particular combination of chambered wheel and flanges is of equal value, whether said flanges are mounted on a driven shaft, as heretofore, or upon a hub as specially devised by me for use on a stationary shaft, by which the bearing-surfaces are much better protected against the entrance of abrasive matter than is possible with a rotative shaft, which requires journal-boxes.

Figures 7, 8, 9:
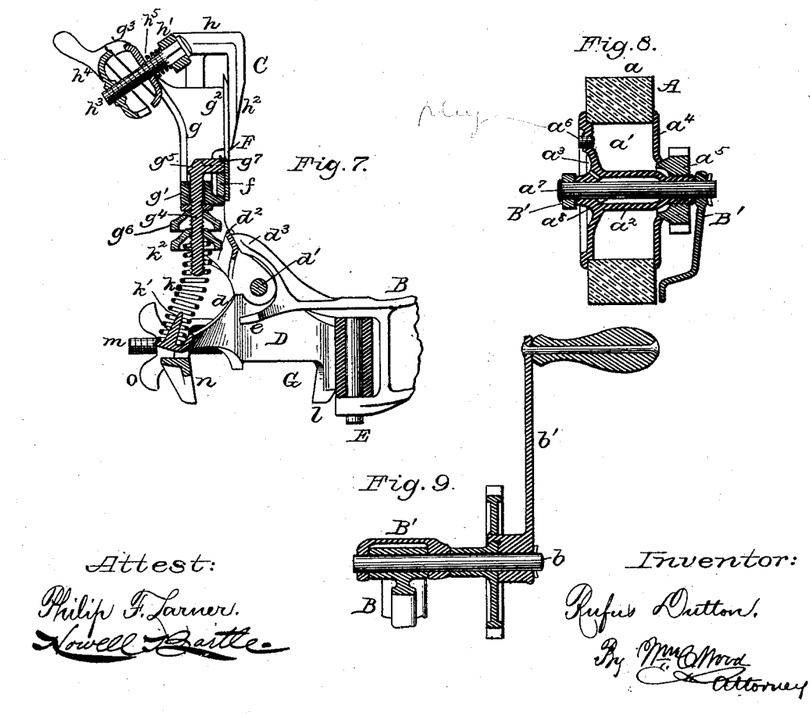
Fig. 7 is a vertical central section of the parts shown in Figs. 5 and 6 with a mower-knife clamped in position preparatory to grinding.
Fig. 8 is an enlarged sectional view of the grinding-wheel and its frame on line $x$, Fig. 3.
Fig. 9 is a similar view of the grinding-wheel frame and crank on line $y$, Fig. 3.

Referring to Fig. 8, it will be seen that the grinding-wheel A is chambered at $a'$, and mounted upon a hollow hub, $a^2$, having an integral flange, $a^3$, near one end, and a movable flange, $a^4$, at its opposite end, and that the wheel is firmly clamped between said flanges by the nut $a^5$, (which in this case is also a gear,) so that said flanges serve as the side walls of a reservoir for water within the stone, which is rendered accessible for filling by way of the screw-plug $a^6$ in one of the flanges. Centrifugal force, induced by the rotation of the wheel at desirable speed, causes the water to pass radially through the stone and out at its grinding-face. The quantity of water capable of being thus delivered is ample to secure good results in grinding, and one charge of water will serve for many hours of actual service. It will be seen in Fig. 8 that the flange $a^3$ has near its periphery and on its inner side an annular shoulder, upon which the grinding-wheel is supported and maintained concentrically to its axis. The wheel with its hub is loosely mounted upon a non-rotative shaft, $a^7$, and the interior of said hub is centrally chambered to afford at each end of the hub a limited but ample contact with the shaft, and also an oil-space, $a^8$.

As distinguished from prior chambered grinding-wheels, mine can be operatively mounted upon either a solid rotative shaft or a non-rotative shaft, instead of requiring a hollow shaft, as heretofore, and my grinding-wheel is complete in itself, and requires no outside appliances, such as a stationary tube or packing or packing-boxes.

The manner of mounting the grinding-wheel upon its frame B may be widely varied without departure from certain portions of my invention. The grinding-wheel is, however, in this form of machine essentially mounted with its shaft located at the end of an arm, B′, constituting a part of the wheel-frame, whether these last-named parts be pivoted together or rigidly united, although in its best form said parts are hinged, as at $b$, on a pivot, which is parallel with the axis of the wheel, and in this case said pivot may also serve as a stud, on which a hand-crank, $b'$, is mounted. The wheel-arm B′ is slotted longitudinally in front of the crank-stud and embraces the grinding-wheel, which is so mounted that its non-rotative shaft is supported at each of its ends by the frame-arm. The crank and the gear-nut $a^5$ on the grinding-wheel are rotatively coupled by a chain of gearing, which is mounted on the side of the wheel-arm; but said gearing may be largely varied in character and arrangement without departure from my invention. I find, however, that gearing so organized as to impart to the grinding-wheel eight revolutions to one of the crank is well suited for my purposes. A curved guard-plate or shield, $b^2$, overlies the wheel. When a solid wheel is employed, the usual dripping-water cup may be relied upon for supplying water to the wheel. The non-rotative wheel shaft or rod $a^7$ has a head at one end and a transverse locking-pin at the other, so that it firmly braces the two sides of the wheel-arm and locks them together, and serves, in fact, as a detachable part thereof, by means of which the wheel can be readily removed and replaced.

With the wheel-arm pivoted at $b$, a provision is requisite for reciprocating the wheel vertically while revolving, and this is conveniently accomplished by extending the rear end of said arm so as to form a lever, and providing it at its outer end with a handle, $c$. For preventing the contact of the face of the wheel with its frame adjacent to the pivot E, as when said wheel is at rest, I provide the wheel-arm at its under side with a stop-stud, $c'$, which by contact with the top of the frame B limits the downward movement of the wheel.

The knife-clamp frame D in this form of machine is a skeletonized casting substantially rectangular at its front and sides, but is extended centrally at the rear. At the front side there is a tubular sleeve or bearing for the reception of the pivot E, by which the frames B and D are hinged together, and it will be seen that this pivot occupies substantially the same plane as the center of the wheel, and that it is substantially radial to the axis of said wheel when in working position, as hereinbefore referred to.

Figure 5:
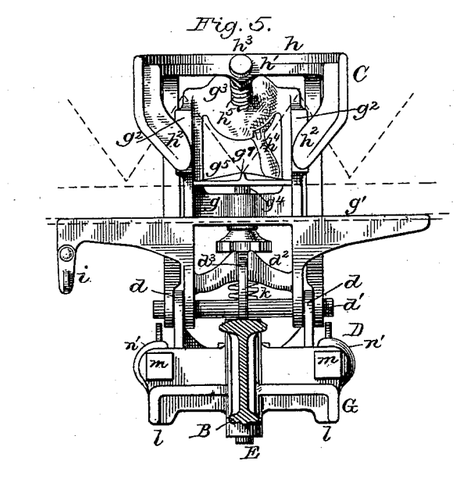
Figs. 5 and 6 are respectively enlarged front and rear views of the knife-clamp and its frame and the base-clamp of the machine shown in Fig. 2, the grinding-wheel being removed and a portion of its frame shown in cross-section.
Figure 6:
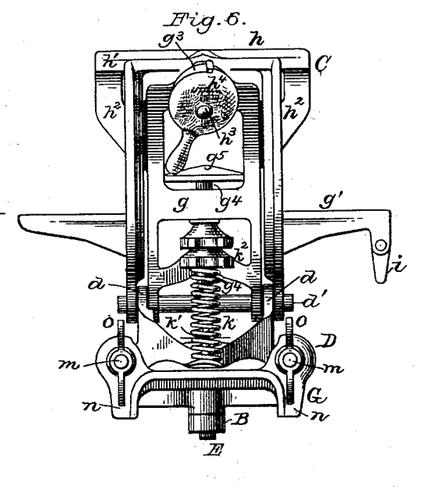

At each end of the frame D, as well shown in Figs. 5, 6, and 7, it is extended upwardly for affording short lugs or ears $d$, which serve as standards for the reception of a rod or bar, $d'$, which is higher than the pivot E, but at the rear thereof and at right angles thereto, and on this rod or bar $d'$ the knife-clamp C is hinged, so as to stand substantially perpendicular to the upper side of the clamp-frame D, and be free to swing toward and from the face of the grinding-wheel. Whatever the character of the knife-clamp, it must grip a mower-knife, F, firmly, and with the knife-bar $f$ toward the base or clamp frame D, and be adapted to present the knife-sections with their beveled edges toward the grinding-wheel and with the junction of any two knife-sections opposite the center of the clamp and also opposite the center of the grinding-wheel face when the latter and the knife are parallel with each other, as indicated in Fig. 3, wherein the wheel and knife are shown in position preparatory to the angular adjustment essential for the grinding operation. It will now be readily understood that by swinging the grinding-wheel toward the right hand the junction of the two knife-sections opposite the face of the wheel will be placed at the left-hand edge of said wheel, and the edge of the right-hand section located in position for grinding, and also that when the wheel is swung toward the left hand, said junction of the two knife-sections will be placed at the right-hand edge of the wheel, and the edge of the left-hand section located in position for grinding. This capacity for successively presenting the two consecutive edges of any two knife-sections to a flat-faced grinding-wheel by a mere change in the angular relations of a knife-clamp frame and a grinding-wheel frame, and without readjustment of the knife in its clamp, or varying its position therein, I believe to be novel. It is obvious that the movement of the two frames, by which the angular adjustment is effected, must be precisely limited in both directions, and this I accomplish by providing a stop, $e$, (clearly shown in Fig. 7,) which may be located on that one of the two frames which has the free swinging movement on the pivot E. As here shown, said stop is a projecting finger integral with or attached to the wheel-frame B, and projecting from near the pivot E toward the clamp-frame D, so that by its contact with the clamp-frame, at or near the inner sides of either of the lugs $d$ thereon, the wheel-frame is restricted to the proper range of movement for securing the desired precise angular adjustment of the knife and wheel.

While the construction of the knife-clamp C may be largely varied without departure from certain features of my invention, the one illustrated has been devised by me and contains certain minor features of invention. This clamp is composed of two main parts, which I will term the "platen" $g$ and the "clamping-jaw" $h$, and both are skeletonized for rendering them as light as possible. The platen $g$ is or may be a single casting having legs hinged at their bases upon the bar $d'$, mounted on the lugs $d$ on the frame D. It has a ledge or knife-seat, $g'$, on which a mower-knife, F, is supported edgewise, and with its bar $f$ on said seat, and it has also two narrow knife-seats, $g^2$ $g^2$, at right angles to the first, and these are so separated and located as to afford bearings for the rear or back side of the knife, and at or near the centers of any two successive knife-sections. At its top or free end the platen $g$ is curved rearwardly from the knife-seats, and is provided with a spiral cam-face, $g^3$, having a central hole therein. At right angles through the knife-seat $g'$, at its center, there is a hole occupied by a threaded bolt or screw, $g^4$, having at its top a rectangular non-rotative head, $g^5$, parallel with said knife seat, and below said seat said bolt has a nut, $g^6$, by which when a knife, F, is in position on its seat its bar $f$ can be firmly clamped between said head $g^5$ and the seat $g'$. This clamping-bolt $g^4$ need not always be used for actually clamping the knife-bar, but can generally be relied upon when between its head and the knife-seat $g'$ a mere recess is provided for the proper reception of knife-bars of various widths. On top of the bolt-head $g^5$, and at its center, it has a gage-point, $g^7$, by which the longitudinal adjustment of a knife in the clamp is accurately gaged by locating the junction of any two knife-sections exactly in line with said gage-point. The clamping-jaw $h$ is also skeletonized, and is preferably in one casting, and has two legs which are hinged upon the bar $d'$ alongside of the legs of the platen $g$. At its outer or free end these legs are united by a rearwardly-curved cross-bar, $h'$, which has at its ends two rigid clamping-fingers, $h^2$, extending toward the bed-plate and also toward each other, so as to overlie the two knife-seats $g^2$ $g^2$ of the platen $g$, and afford ample intervening space for the reception of knife-sections. At the center of the curved cross-bar $h'$ there is a transverse hole occupied by a headed bolt, $h^3$, having its threaded shank passed through the hole in the center of the cam-face $g^3$ at the free end of the platen $g$, and tapped to the outer end of said bolt there is a cam-faced nut, $h^4$, by turning which on the cam-face $g^3$ the seats $g^2$ $g^2$ and the coincident faces of the clamping-fingers $h^2$ $h^2$ are promptly forced toward each other and enabled to heavily grasp and rigidly clamp one or two interposed knife-sections. The bolt $h^3$ is non-rotative, having a square shank and occupying a square hole, so that by taking it out, partially rotating it, and reinserting it the cam-nut can be made to occupy different longitudinal positions on the bolt, and thus provide for rigidly clamping knife sections regardless of variations in thickness as well as any variations in the clamping-fingers. For enabling a prompt release of the knife by the separation of said seats and fingers, an expansive spiral spring, $h^5$, is introduced between the platen $g$ and jaw $h$, and it is conveniently mounted upon the bolt $h^3$. The knife when thus held in the clamp is substantially horizontal, and although during the grinding operation it is inclined slightly from its bar to the tips of its sections, it is yet substantially horizontal. So long as the clamp can engage with two knife-sections it will firmly hold the knife; but in grinding the outer edge of the last or outer knife-section the clamp can only engage with that one section, and for maintaining the knife firmly in position the clamp-button $i$ is used. This button $i$ is pivoted upon the outer side of the knife-seat $g'$ and at one end thereof, so that by swinging it upward it will forcibly engage with a knife and co-operate with the adjacent knife-seat $g^2$ and clamp-finger $h^2$ for firmly holding the knife in position.

As thus far described, the machine can be used to good advantage, even if two persons be required to operate it—one for turning the grinding-wheel and the other for moving the clamped knife toward and against the wheel, because neither of said persons need be skilled grinders, inasmuch as the holding of the knife is wholly performed by the clamp, and the adjustment of knife and wheel involve no contact of the hand of the operator with the knife whatever during the grinding-contact of wheel and knife. All that is required for enabling one person to do the work as well as two could do it is to provide the knife-clamp with a spring which will move the clamp toward and force the knife against the grinding-wheel, and hold it there under proper pressure.

Knife-clamps for use with flat-faced grinding-wheels have heretofore embodied springs, but in all prior contrivances known to me for grinding mower-knives on flat-faced wheels the knife must be manipulated during the grinding operation, either so as to provide for keeping a knife-section next to the one which is being ground away from the edge or side of the stone or wheel or for determining the bevel on the knife-section, or for sweeping the beveled edge to and fro on the grinding-surface, or for controlling the knife in some way. I apply an expansive spiral spring, $k$, which is seated at one end upon the clamp-frame D, which has a spur, $k'$, at its rear edge, and at its other end said spring abuts upon a nut, $k^2$, on the bolt $g^4$ of the platen $g$, so that said bolt occupies the interior of the spring and confines it in place, said nut $k^2$ serving as an adjustable spring-seat, whereby the power of the spring may be variably applied.

It is obvious that changes in the angular adjustment of the clamp and wheel while the knife is in contact with the wheel would be liable to injure the knife-edge, and therefore the clamp should be moved rearward preparatory to making these changes, and this can be conveniently done by hand, although I have devised means whereby the clamp will be thrown backward by swinging either frame laterally. At a short distance above its hinge-rod $d'$ the clamp has an outwardly-projecting cam-faced cross-bar, $d^2$, with a central notch therein. The frame B has a rigid finger, $d^3$, projecting beyond and above the pivot E, and has its outer end in the plane occupied by the cam-face $d^2$, so that when the wheel-frame is swung around said finger at its end sweeps the cam-face, and at once forces the clamp rearwardly from the stone, and when said finger reaches and enters the central notch the clamp-frame is held in the position indicated in Fig. 2, and a release from said notch may be effected by a continued swinging movement of the wheel, or by pressing the clamp rearward by hand. The finger $d^3$ and the stop $e$, before described, have in some cases a shank common to both, and they are both integral with the frame B; but these are mere incidents in construction.

This general form of machine as thus far described may be variously mounted upon any suitable support without departure from the main features of my invention; but I have provided it with a base-clamp, G, by which it may be mounted on a bench or table provided with a suitable surface, or so that when used in the field it may be firmly mounted on the traction-wheel of a mowing-machine. The knife-clamp frame D, in Figs. 2, 3, and 4, has in front, serving as portions of said base-clamp G, two pendent integral fixed jaws, $l$, and also with two lateral ears near its rear side, and each pair of these has a hole for receiving a non-rotative threaded bolt, $m$. Two movable jaws, $n$, of the base-clamp are cast in one piece, and each jaw $n$ has a rectangular integral guiding-finger, $n'$, which extends toward the coincident fixed jaw, and at its outer end bears with a concave face upon the top of its clamp-bolt $m$ at a non-threaded portion thereof. Each bolt has a thumb-screw, $o$. The two movable jaws are mounted on the bolts, and are guided truly thereon by the fingers $n'$, thus enabling the machine to be rigidly mounted on any firm foundation presenting substantially parallel and rectangular surfaces of various widths.

As hereinbefore indicated, it is not new to provide a grinding-wheel frame with a clamp, by which it may be attached to a finger-bar for field service; but I am the first to provide a machine embodying a wheel-frame and a knife-clamp and its frame with a base-clamp, whereby the whole may be mounted upon a mowing-machine, so that the latter may be used as a work-bench while grinding knives detached from the finger-bar.

Figure 10:
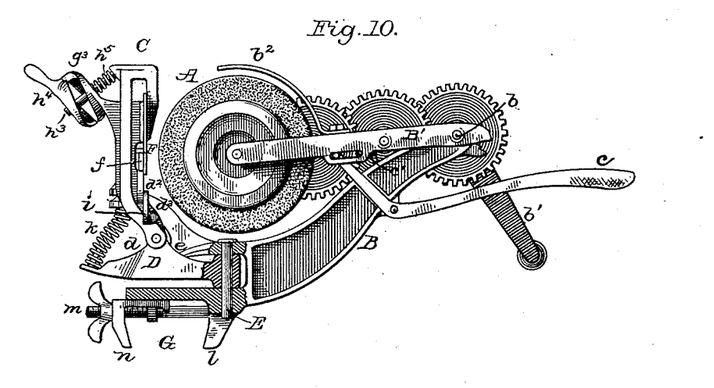
Fig. 10, in side view and section, illustrates a form of machine embodying my invention and in which the grinding-wheel frame is integral with portions of the base-clamp and having a separate lever for reciprocating the wheel.

While I prefer the simple form of machine shown in Figs. 2, 3, and 4, it is to be distinctly understood, as hereinbefore indicated, that it will be within certain portions of my invention if the grinding-wheel have no laterally-swinging capacity, provided the knife-clamp frame and the wheel-frame can be guided in the arc of a circle, as when hinged on a pivot arranged as before described—as, for instance, as illustrated in Fig. 10, the grinding-wheel frame B is integral with a portion of the base-clamp or other suitable base-plate, so that it has no lateral swinging capacity. In this case the clamp-frame D is as before described, except that it is disconnected from the base-clamp, and is hinged to the wheel-frame B upon the pivot E, which, as before described, is in a line substantially radial to the center of the axis of the grinding-wheel, and at right angles to its shaft, and therefore when the clamp-frame is swung to the right hand or the left it will present a knife to the two edges of the grinding-wheel precisely in the same manner as when said wheel is capable of swinging. When thus organized, the stop $e$, as before described, projects from the frame B near the pivot E; but in this case it is stationary and is abutted by either of the two hinge-lugs $d$ on the knife-clamp frame D when the latter is swung into either of its two angular positions of adjustment. In this form of machine the cam-faced bar $d^2$ and the finger $d^3$ on the frame B operate, as before described, for throwing the knife-clamp rearward during the changes in its angular adjustment. When the wheel-frame is thus non-pivoted, the wheel-arm need not have an extension to serve as a lever; but the wheel may be reciprocated by means of a separate lever pivoted on the frame B, and having at its inner end a pin occupying one or more guide-slots on the under side of the wheel-arm and at its outer end a handle, $c$.

Figure 1:
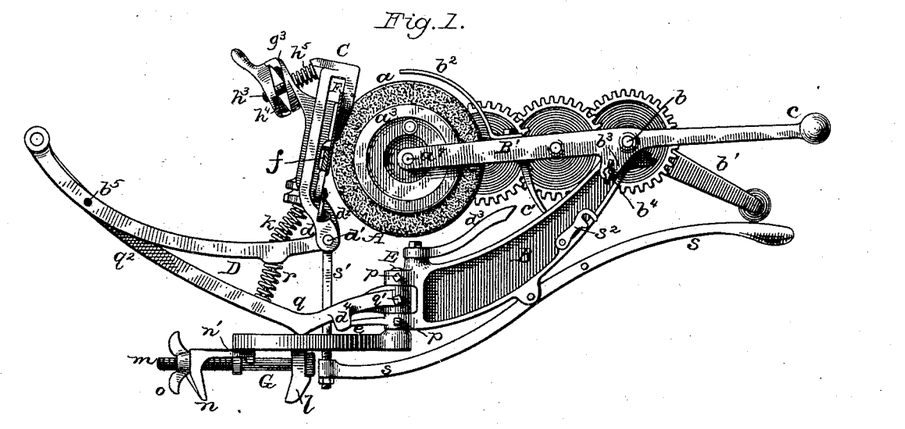

Although my machine in its best form has a grinding-wheel which, while revolving, is vertically reciprocated, it is to be understood that without departure from certain portions of my invention said grinding-wheel may be limited to a rotative movement, and the knife-clamp frame be reciprocated in lieu of thus moving the wheel. The extent of this reciprocating movement of the wheel at its grinding-face need seldom be more than two or two and one-half inches, and a vertical reciprocation of the knife-clamp to that extent can be readily provided for and easily controlled—as, for instance, I will now refer to Fig. 1, wherein I show a complex machine embodying all of the features of my invention. In this case the base-clamp G is separately constructed to serve as a base-plate, and the pivot E is integral therewith or rigidly mounted thereon, and preferably larger and heavier than would be required in either of the other two forms of machine. The wheel-frame B, as before described, is hinged upon said pivot E, but is provided with set-screws $p$, by which it may be rigidly secured to said pivot. The wheel-arm B′ is hinged, as before described, upon the frame B, but at its pivot $b$ it is provided with one or two pendent cheeks, $b^3$, having holes therein for the reception of the locking-pin $b^4$ by which said arm may be rendered immovable on its pivot $b$. The knife-clamp C is as before described, but its frame D is composed of two parts—one having lugs $d$, on which the knife clamp is mounted on the rod $d'$, precisely as before described, and the other a bed-frame, $q$, which is directly hinged to the pivot E, and has a set-screw, $q'$, by which said frame may either be immovably fixed thereon or permitted to swing. In the two forms of machine previously described the wheel is normally depressed, and must be raised for traversing the edge of a knife-section, and therefore if the wheel be not vertically reciprocated the clamp must be normally elevated and then depressed for obtaining this traversing action. This is accomplished by providing the clamp-bed frame $q$, as shown in Fig. 1, with a pair of parallel vertically-curved tail-pieces, $q^2$, and hinging the knife-clamp to them by means of similar tail-pieces, the pivot being at such a point from the face of the stone or wheel as will enable the clamp to move in the same circular arc in which the grinding-surface of the wheel is moved in one of the other forms of machine. In both of said other forms the wheel drops to its lowest or normal position by gravity; but in this machine the clamp is elevated to its normal position by the expansive spring $r$, which is interposed between the two parts of the clamp-frame, and for reciprocating said clamp a hand-lever, $s$, pivoted to the frame B, is coupled to the base of the clamp above the bed-frame $q$ by means of a flexible or flexibly-jointed link, $s'$. A hook, $s^2$, on the frame B for engaging with the lever $s$, will firmly hold the clamp-frame in a depressed position when desired. In this form of machine the stop $e$ is as before described; but instead of abutting against the hinge-rod ears $d$, other pendent ears, $d^4$, are provided for that purpose on the bed-frame $q$. The cam-faced cross-bar $d^2$ is also here used, as well as the finger $d^3$; but as this latter can only be used when this machine is adjusted to operate like the other two forms of machine described, said finger is movable on a locking-pivot, so that it can be swung out of the way except when desired for service.

It will be readily obvious if the knife-clamp frame D be locked by its set-screw $q'$ to the pivot E, the frame B unlocked therefrom, the knife-clamp depressed and held by the hook $s^2$, and the finger $d^3$ swung around to the front and locked in position, and the wheel-arm B′ released by removing the locking-pin $b^4$, and the latter then placed in the hole $b^5$ in the tail-pieces of the clamp-frame, that the machine will then be capable of operation, precisely the same as with the form illustrated in Fig. 2. The insertion of the pin $b^4$ into the hole $b^5$ locks the curved tail-pieces of the clamp-frame and bed-frame together, so that said pin supplements the holding effect of the hook $s^2$, and firmly secures the clamp against any vertical movement. If, now, the frame B be locked to the pivot E by its set-screws $p$, and the clamp-frame unlocked therefrom, the machine will be capable of being operated, as with the form shown in Fig. 10.

It is to be understood that the proportion of the grinding-wheel face to the width of the knife-section may be considerably varied without rendering the machine useless, so long as the flat grinding-face is traversed to and fro evenly. The hinge-pivot E may also not be arranged so as to be exactly radial to the center of the axis of the grinding-wheel, so long as it is rectangular to the shaft of said wheel and the knife-clamp stands substantially parallel with said pivot, and the latter is located below said clamp, beneath the wheel and opposite the center of its grinding-face, so that said wheel will be partially interposed between the knife held in the clamp and said pivot, thus making some point within the wheel the center of motion by which the angular adjustments are effected.

Figures 11, 12:
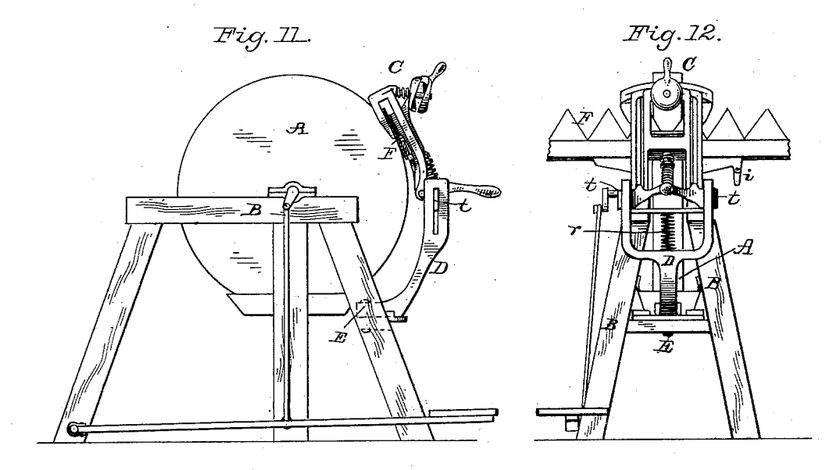
Figs. 11 and 12 in side and end views, illustrate a machine having no base-clamp, a grinding-wheel frame correspondingly modified in its construction and with a knife-clamp frame adapted to use therewith in accordance with my invention.

It is further to be understood that the main features of my invention do not depend upon any particular mechanism for driving the guiding-wheel, and that accelerating-gearing is only required with a wheel of small diameter, so as to afford a desirable speed at its grinding-surface—as, for instance, when a larger stone is desired no gearing is needed, because it can be operated by means of a treadle, like an ordinary grindstone; and for further illustrating what wide variations can be made in the form of machine without departure from the main features of my invention, I will refer to Figs. 11 and 12. In this machine the grinding wheel or stone A is or may be like an ordinary grindstone of suitable character; and it is mounted in its frame B in the usual manner, so as to stand upon the floor or the ground, and is provided with a water-trough, crank, pitman, and treadle, all in a manner well known, except that the frame B is so constructed as to leave the front portion of the stone accessible for properly mounting the clamp-frame D upon its pivot E, as before described, beneath the stone and coincident with the center of its face. The knife-clamp C is precisely as before described, and is also arranged to reciprocate vertically; but instead of being pivoted for that purpose, it has projecting from its base at each side two vertical flat wings or blades, $t$, which occupy and snugly slide in vertical slots in the clamp-frame, as clearly shown, and the clamp is supported on a spring, $r$, so that the latter will maintain the clamp and its knife in its normal elevated position, and said clamp is provided with a handle, so that it can be conveniently reciprocated vertically by hand, while the wheel is revolved by the foot of the operator.

Figure 13:
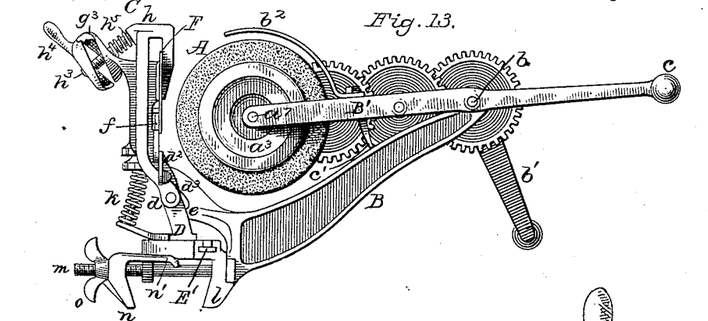
Figs. 13 and 14 in side and top view illustrate a simple form of machine embodying certain features of my invention, and in which the clamp-frame and wheel-frame are coupled by a segmental guide instead of by means of a guiding pivot-bolt as in each of the other forms.
Figure 14:
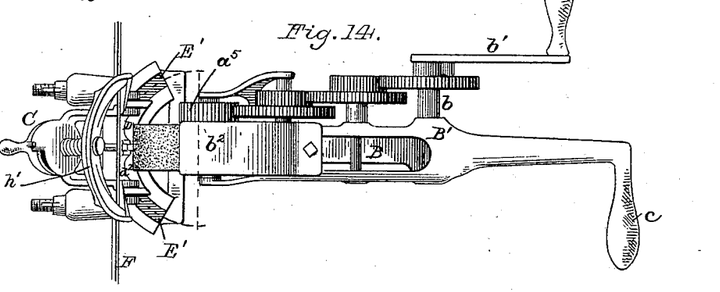

It is to be further understood, as hereinbefore indicated, that the form of the swiveling connection between the clamp-frame and the wheel-frame may be widely varied without departure from the main features of my invention; and as an illustration of one such obvious variation, I will refer to Figs. 13 and 14 for indicating how readily the center of motion, by the clamp-frame, is located within the body of the grinding-wheel without the use of a pivot in the form of a rod or bolt, for hinging said frame to the wheel-frame. In this form of machine the wheel A, its frame B, and the knife-clamp C are in no essentials different from those in the forms of machine before described. The knife-clamp frame D is different in form; but the clamp is hinged thereto, as before described. In this case the clamp-frame is provided on its under side with a dovetailed or T-shaped block, segmental in form, which occupies a segmental guiding-groove on a bed-plate integral with the wheel-frame, and said slot snugly receives said block, but permits the latter to slide horizontally therein. This groove E' is an arc of a circle sweeping across the face of the wheel and having its center within the body of the wheel, as clearly indicated in dotted lines. It will be obvious that the pivot E in all the other forms of my machine is a convenient and desirable form of guide for limiting the movement of the clamp or the wheel, as the case may be, to the arc of a circle centering within the body of the wheel, and that the segmental grooved guide E' is in substance a portion of the periphery of a large pivot, which, like the pivot E, has its axis located substantially in a line radial to the axis of the wheel, and at right angles thereto. In this form of machine the grinding-wheel arm B' is pivoted on the frame B; but this latter, as in Fig. 10, is immovable, and the wheel is reciprocated vertically, as shown in Figs. 1 and 2, although a separate lever may be employed for that purpose, as shown in Fig. 10. The stop $e$ operates, as before described, in connection with the ears $d$ on the clamp-frame, and so, also, does the finger $d^3$ co-operate with the cam-faced bar $d^2$ for throwing the clamp rearward, as before described.

Figure 15:
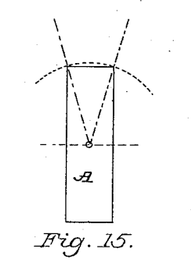
Fig. 15 is a diagram illustrating the grinding-wheel in top view, the arc of the circular path to which either the grinding-surface or the knife is limited while shifting from one angular position of adjustment to the other, and also the center of said circle located within the body of the wheel or stone, this figure being applicable to either of the forms of machine illustrated.
Figures 16, 17, 18:
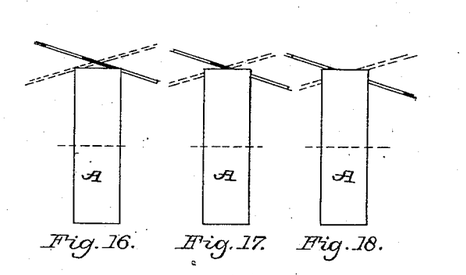
Figs. 16, 17, and 18 are diagrams similar to Fig. 15, applicable to all of the forms of machine shown, and in each case illustrate a grinding-wheel in top view and a mower-knife in contact therewith, and said figures respectively indicate the relative positions of knife and wheel while grinding one edge at the bottom of a V between two knife-sections, next while grinding the middle of the edge, and finally while grinding at the tip. Dotted lines in each figure indicate the relative positions of the knife and wheel during corresponding operations at the opposite or coincident edge of the adjoining knife-section.

Machines constructed in either of these forms will rigidly hold a knife against any movement independently of the movement of its clamp and the clamp-frame. The knife in each is wholly controlled during the grinding operation by the spring $k$, at the base of the clamp, and the operator need not touch the knife, except after two coincident edges have been ground, and then only for moving the knife longitudinally. The clamp in each machine is guided in the same circular path for presenting a knife in precisely the same manner at both edges of the grinding-wheel, as illustrated in Fig. 15, and while grinding, the contact-points between the knife and wheel traverse alternately to and fro, evenly across the face of the wheel, and each portion of each knife-section edge is ground upon a corresponding portion of the wheel-face, as illustrated in Figs. 16, 17, and 18, and hence the grinding-surface is always worn evenly, the edges of the wheel preserved, and the grinding performed with the greatest practicable uniformity. With either of these machines the coincident edges of any two knife-sections can be consecutively ground by merely changing the angular adjustment, and so far as my knowledge extends this cannot be done with any prior grinding-machine or grindstone attachment without also changing the longitudinal adjustment of the knife in its clamp.

Having thus described my invention, I claim as new, and desire to secure by Letters Patent—

1. In a mower-knife-grinding machine, the combination, substantially as hereinbefore described, of a rectangular-faced grinding-wheel and a knife-clamp, respectively mounted on separate frames, which are swiveled together and movable in the arc of a circle centering within the grinding-wheel in front of the clamp and its frame, and with said center substantially coincident with the center of the peripheral face of the grinding-wheel, whereby in changing the angular relations of the grinding-face and a knife held in said clamp either said face or said knife will be moved in the arc of a circle centering in front of the clamp, and within the body of said wheel, and enabling the two coincident edges of any two knife-sections to be consecutively ground at opposite edges of the wheel without handling of the knife.

2. In a mower-knife grinding machine, the combination, substantially as hereinbefore described, of a grinding-wheel having a rectangular grinding-face at its periphery, a mower-knife clamp, and frames for said clamp and wheel, which are hinged together by a guiding-pivot, which is substantially radial to the center of said wheel and rectangular to its axis.

3. In a mower-knife-grinding machine, the combination, substantially as hereinbefore described, of a knife clamp frame, a knife-clamp for rigidly holding a mower-knife bar and its attached knife-sections, and hinged on top of said frame, substantially at right angles thereto, a grinding-wheel frame, a pivot rectangular to the knife-clamp hinge for hinging said two frames together, and a grinding-wheel having a flat-faced grinding periphery mounted in its frame, and having a portion of its periphery interposed between said pivot and the knife-seats of the clamp and on an axis rectangular to said pivot.

4. In a mower-knife-grinding machine, the combination, substantially as hereinbefore described, of a spring-backed knife-clamp, a grinding-wheel having a flat peripheral grinding-face and separate frames for said clamp and wheel, which are essentially hinged together upon a pivot substantially parallel with the knife-clamp and rectangular to the axis of the grinding-wheel and substantially radial thereto.

5. In a mower-knife-grinding machine, the combination, substantially as hereinbefore described, of the knife-clamp, the rectangular-faced grinding-wheel, and means for reciprocating either of them, the frames on which both are mounted, and a pivot substantially opposite the center of said wheel and rectangular to its axis for hinging said frames together.

6. In a mower-knife-grinding machine, the combination, substantially as hereinbefore described, of a spring-backed knife-clamp, a knife-clamp frame on which said clamp is hinged at its base, a grinding-wheel frame, a pivot for hinging the latter to said clamp-frame, and a rectangular-faced grinding-wheel on an arm hinged to its frame, and mounted on a shaft which is parallel with its arm-hinge axis and at right angles to the pivot by which said two frames are hinged.

7. In a mower-knife-grinding machine, the combination of a knife-clamp, a knife-clamp frame, a grinding-wheel frame, a pivot hinging said frames together, and a grinding-wheel having a rectangular grinding face or periphery slightly wider than one-half the width of a knife-section, and mounted on a shaft which is substantially in line with said pivot and rectangular thereto.

8. In a mower-knife-grinding machine, the combination, with a knife-clamp, of the rectangular-faced grinding-wheel, its shaft, its arm having bearings for both ends of said shaft, the gearing on said arm, the crank, the lever or handle at the outer end of said arm, and the frame on which said arm is hinged, substantially as described.

9. In a mower-knife-grinding machine, the combination of a grinding-wheel and its hub, a slotted wheel-arm mounted upon a supporting-frame, a non-rotative detachable shaft for said wheel supported at both ends by said arm, and the gearing and crank mounted on said arm for driving said wheel, substantially as described.

10. The combination, with the grinding-wheel, of the mower-knife clamp having the platen $g$, the clamping-jaw $h$, having rigid fingers, a ledge or seat for a knife-bar, the knife-section seats opposite said fingers, the cam-faced clamping-nut, and the bolt connecting it with the jaw $h$, substantially as described.

11. The combination, substantially as described, of the rectangular-faced grinding-wheel, the knife-clamp, the wheel-frame and knife-clamp frame hinged together by a pivot substantially radial to the axis of the wheel, and a stop by which the hinging movement on said pivot is equally limited in both directions.

12. The combination, substantially as hereinbefore described, of the knife-clamp frame, the knife-clamp hinged thereto, the grinding-wheel, the grinding-wheel frame hinged to the clamp-frame on a pivot substantially radial to the wheel, a cam-faced bar on said clamp, and a finger on the wheel-frame coincident with said cam-faced bar for engaging therewith and forcing the clamp away from the wheel during changes in their angular relations.

13. In a mower-knife-grinding machine, the combination, with the grinding-wheel, of the knife-clamp provided with rigid fingers for engaging with the knife-sections, and a ledge or seat for the knife-bar extended laterally from below said fingers, and a clamp-button on said seat near its end for engaging with the front of a knife at its rear edge, and thereby co-operating with one of said clamp-fingers for firmly holding the knife in position while its end section is presented to the wheel for grinding.

14. In a mower-knife-grinding machine, the combination, substantially as hereinbefore described, of a grinding-wheel containing a central water-chamber, and a pair of flanges which serve as the side walls of said chamber and by which said wheel is clamped and supported concentrically with relation to its axis.

15. In a mower-knife-grinding machine, the combination, substantially as hereinbefore described, of a grinding-wheel provided with a central water-chamber and a tubular hub provided with flanges for centering and clamping said wheel, whereby said wheel may be mounted upon a stationary shaft.

16. In a mower-knife-grinding machine, the combination of a grinding-wheel and its frame and a knife-clamp and its frame, couplings by which said frames are swiveled together, and a base-clamp, substantially as described, whereby the machine may be mounted for service upon and clamped to a mowing-machine wheel or other suitable foundation.

RUFUS DUTTON.

Witnesses:
   PHILIP F. LARNER,
   HOWELL BARTLE.